United States Patent
Hwang et al.

(10) Patent No.: US 6,922,209 B1
(45) Date of Patent: Jul. 26, 2005

(54) IMAGING APPARATUS AND IMAGE SIGNAL PROCESSING METHOD PRODUCING WIDE DYNAMIC RANGE

(75) Inventors: Jung-Hyun Hwang, Sungnam (KR); Woon Na, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/273,643

(22) Filed: Mar. 23, 1999

(30) Foreign Application Priority Data

Sep. 1, 1998 (KR) .............................. 98-35852

(51) Int. Cl.[7] .......................... H04N 5/235; H04N 1/40; G06K 9/00
(52) U.S. Cl. ..................... 348/229.1; 382/168; 358/443
(58) Field of Search .............................. 348/230.1, 679, 348/222.1, 362, 229.1, 296, 254, 645, 646, 647, 672, 678, 674, 675, 677, 722.1, 302, 600; 358/550, 443; 382/168, 171, 172

(56) References Cited

U.S. PATENT DOCUMENTS

| | | | |
|---|---|---|---|
| 5,144,442 A | | 9/1992 | Ginosar et al. ............. 358/209 |
| 5,396,288 A | | 3/1995 | Tsugita et al. .............. 348/229 |
| 5,818,521 A | * | 10/1998 | Hieda ......................... 348/222 |
| 5,828,793 A | * | 10/1998 | Mann .......................... 382/284 |
| 5,982,926 A | * | 11/1999 | Kuo et al. ................... 382/167 |
| 6,130,724 A | * | 10/2000 | Hwang ........................ 348/678 |
| 6,373,533 B1 | * | 4/2002 | Kawabata et al. .......... 348/672 |
| 6,384,937 B1 | * | 5/2002 | Matama ....................... 358/529 |
| 6,573,934 B1 | * | 6/2003 | Lee ............................. 348/254 |

FOREIGN PATENT DOCUMENTS

JP    199202243993    3/1995    .......... H04N/5/235

* cited by examiner

*Primary Examiner*—Aung Moe
*Assistant Examiner*—Rashawn N Tillery
(74) *Attorney, Agent, or Firm*—Mills & Onello LLP

(57) ABSTRACT

An imaging apparatus and method provides a wide dynamic range and is capable of displaying an improved color in low-luminance regions, and an image signal processing method thereof. In the imaging apparatus, a first process divides the voltage level of an analog image signal into a plurality of sections and amplifies the analog image signal with a plurality of different gains according to each section, and a second process converts the analog image signal amplified with the different gains into a digital signal, and non-linearly gamma-corrects the digital signal according to each section. The plurality of different gains may be inversely proportional to the luminance level of the analog image signal. Thus, the level of an analog signal in a low-luminance region is amplified with a gain greater than in a high-luminance region before gamma correction, so that signal-to-noise (S/N) ratio in the low-luminance region of an image is increased, thereby improving sensitivity of the image following gamma correction. Accordingly, a wide dynamic range is provided. An optional chrominance controller of the imaging apparatus controls chrominance gain of the digital signal and outputs the result, thereby displaying an improved color in low-luminance regions of the image.

16 Claims, 5 Drawing Sheets

IMAGING APPARATUS AND IMAGE SIGNAL PROCESSING METHOD PRODUCING WIDE DYNAMIC RANGE

BACKGROUND OF THE INVENTION

1. Field of the Invention

The present invention relates to an imaging apparatus, and more particularly, to an imaging apparatus and an image signal processing method thereof providing a wide dynamic range.

2. Description of the Related Art

The human eye has a dynamic range of approximately 120 dB. The dynamic range is a visible range of sight imaging from dark regions to light regions visible to the human eye. However, in general artificial signal processing techniques utilized by an imaging apparatus such as a digital camera adopting a charge coupled device (CCD), the generated images exhibit a range of only approximately 60 dB. Ongoing research into signal processing methods has therefore been conducted, with the goal of widening the dynamic range.

Also, when an image signal is displayed in the monitor of a camera, the dark regions in a low-luminance image are often displayed darker than the luminescence of an actual imaged dark object. In order to compensate for this phenomenon, a gamma correction method is employed for lightening the extreme dark region by amplifying low-luminance portions of the image according to a predetermined gain.

However, in the conventional gamma correction technique, because the signal-to-noise ratio (S/N ratio) in a low-luminance image is often very low, image sensitivity therefore decreases to a extremely low level following amplification. Also, a digitally-quantized value generated from the analog image signal, is converted with a high conversion rate, thereby increasing quantization noise and increasing lumping in the output image. Display of color is likewise adversely affected by the conventional correction process.

Therefore, in the conventional gamma correction technique, dynamic range is limited, low-luminance image sensitivity is decreased, and color display is inaccurate.

SUMMARY OF THE INVENTION

To solve the above problems, it is a first object of the present invention to provide an imaging apparatus having a wide dynamic range.

It is a second object of the present invention to provide an imaging apparatus capable of improving color display in low-luminance regions of the image.

It is a third object of the present invention to provide an image signal processing method for widening dynamic range.

To achieve the first object, a first aspect of the present invention provides an imaging apparatus comprising: first signal processing means for partitioning, or dividing, the level of an analog image signal into a plurality of sections, and for amplifying the analog image signal by a plurality of gains according to each section. At least two of the sections have different corresponding gains. Second signal processing means convert the analog image signal amplified by the different gains into a first digital signal, and non-linearly gamma-corrects the digital signal according to each section.

Preferably, the first signal processing means comprises a first analog-to-digital converter, a gain selector and an amplifier. The first analog-to-digital converter converts the analog image signal into a first digital signal for dividing the analog image signal level into the plurality of sections, and the gain selector selects the corresponding gain from the plurality of different gains according to each section, and outputs the selected gain. Also, the amplifier amplifies the analog image signal with the gain output from the gain selector. Preferably, the plurality of different gains are approximately inversely proportional to the luminance level of the analog image signal.

Preferably, the second signal processing means comprises a second analog-to-digital converter and a gamma corrector. The second analog-to-digital converter converts the image signal amplified by the plurality of different gains into a second digital signal, and the gamma corrector non-linearly gamma-corrects the digital signal according to each section.

Preferably, the imaging apparatus further comprises a chrominance controller for controlling a chrominance gain of the output of the second means.

To achieve the second object of the present invention, a second aspect of the present invention provides an imaging apparatus comprising an amplifier, an analog-to-digital converter, a chrominance controller and a digital signal processor. The amplifier amplifies an analog image signal by a predetermined gain, and the analog-to-digital converter converts the amplified analog image signal into a digital signal. Also, the chrominance controller controls chrominance gain of the converted output of the analog-to-digital converter, and the digital signal processor processes the output of the chrominance controller.

Preferably, the chrominance controller comprises a low-pass filter, a chrominance gain selector, a high pass filter, a multiplier, an adder, a divider and a clipper. The low pass filter passes a low-frequency component of the converted output of the second means, to output a luminance signal, and the chrominance gain selector divides the level of the luminance signal into a plurality of sections, and selectively outputs the corresponding gain among the plurality of different gains according to each section. The high pass filter passes a high frequency component of the converted output of the second means, to output a chrominance signal, the multiplier multiplies the chrominance signal by the corresponding gain output from the chrominance gain selector, and the adder adds the output of the multiplier to the luminance signal. Also, the divider divides the output of the adder by a factor, for example 2, and the clipper outputs a digital 0 if the output of the divider is less than 0, the maximum value of the output of the second means if the output of the divider is greater than the maximum value of the output of the second means, and the output of the divider if the output of the divider is greater than 0 and less than the maximum value of the output of the second means. Preferably, the plurality of different gains are approximately inversely proportional to the level of the luminance signal, or otherwise are not inversely proportional thereto depending on the application.

To achieve the third object of the present invention, there is provided an image signal processing method of an imaging apparatus, comprising the steps of: (a) dividing the level of an analog image signal into a plurality of sections, and amplifying the image signal with a plurality of different gains according to each section; and (b) converting the image signal amplified by the plurality of different gains into a first digital signal, and non-linearly gamma-correcting the first digital signal according to each section.

Preferably, the step (a) comprises the sub-steps of: (a1) converting the analog image signal into a digital signal to divide into the plurality sections; (a2) selecting the corresponding gain among the plurality of different gains according to each section; and (a3) amplifying the analog image signal with the selected gain. Here, the plurality of different gains may be approximately proportional to the luminance level of the analog image signal.

Preferably, the step (b) comprises the sub-steps of converting the image signal amplified with the plurality of different gains into a second digital signal, and non-linearly gamma-correcting the second digital signal according to each section.

In order to improve color display in a low-luminance region, the image signal processing method further comprises the step of (c) controlling a chrominance gain of the gamma-corrected digital signal.

Preferably, the step (c) comprises the sub-steps of: (c1) passing a low-frequency component of the gamma-corrected digital signal, to output a luminance signal; (c2) dividing the level of the luminance signal into a plurality of second sections, and selecting the corresponding gain among the plurality of different second gains according to each section; (c3) passing a high-frequency component of the non-linearly gamma-corrected digital signal, to output a chrominance signal; (c4) multiplying the chrominance signal by the selected second gain; (c5) adding the result of the sub-step (c4) to the luminance signal; (c6) dividing the result of the sub-step (c5) by 2; and (c7) clipping to 0 if the result of the sub-step (c6) is less than 0, and to the maximum value of the gamma-corrected digital signal if the result of the sub-step (c6) is greater than the maximum value of the gamma-corrected digital signal, and outputting the result. Here, the plurality of different second gains may be approximately inversely proportional to the level of the luminance signal or may be not inversely proportional thereto if required.

Thus, in the imaging apparatus and the image signal processing method according to the present invention, before gamma correction, the level of a low-luminance region of an analog image signal is amplified with a gain higher than in the level of a high-luminance region. Accordingly, the S/N ratio in the low-luminance region of the image is increased, so that the sensitivity of the image is improved after the gamma correction. Also, a quantized value for the analog image signal, i.e., a digital value, is non-linearly converted, i.e., non-linearly gamma-corrected, to reduce quantization noise, thereby preventing lumping of an output image to a predetermined level. That is, in the imaging apparatus and the image signal processing method thereof according to the present invention, the dynamic range is wide, and a color display characteristic is improved in a low-luminance region.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
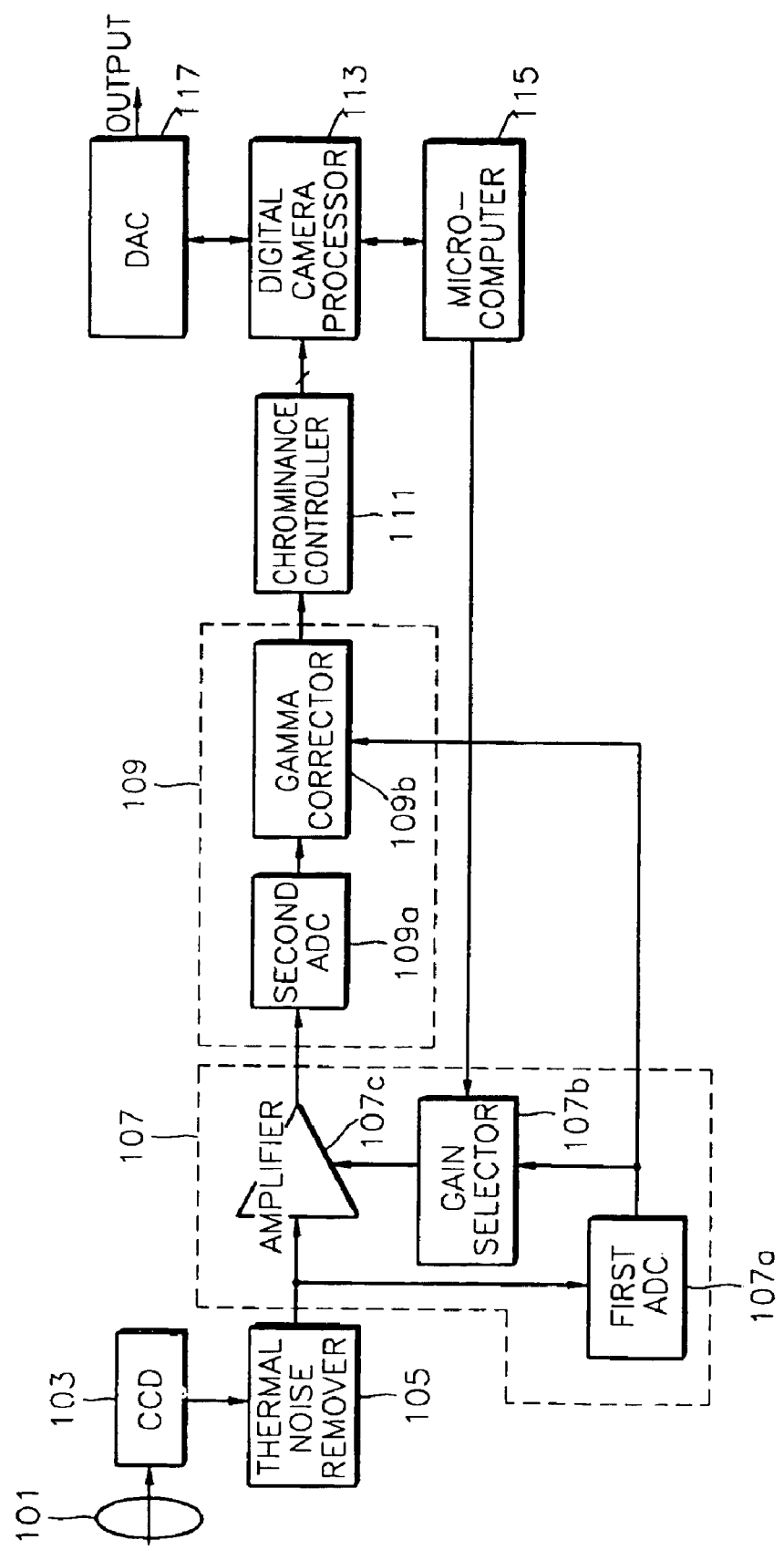
FIG. 1 is a block diagram of an imaging apparatus according to a preferred embodiment of the present invention.

Referring to FIG. 1, an imaging apparatus according to a preferred embodiment of the present invention includes a charge coupled device (CCD) 103, a thermal noise remover 105, a first signal processing means 107, a second signal processing means 109, a chrominance controller 111, a digital camera processor 113, a microcomputer 115, and a digital-to-analog converter (DAC) 117. The imaging apparatus operates by an image signal processing method according to the present invention.

The CCD 103 receives an optical image signal via a lens 101 and converts the received image signal into an electrical analog image signal. The thermal noise remover 105 removes thermal noise from the electrical analog image signal output from the CCD 103. In general, the thermal noise remover 105 may comprise a correlated double sampler.

The first signal processing means 107 partitions the voltage level of the analog image signal passed through the thermal noise remover 105 into a plurality of sections, and amplifies the analog image signal with a plurality of different gains which are predetermined according to the sections (see FIGS. 2 and 3, discussed below). Here, the plurality of gains are provided by the microcomputer 115, and are inversely proportional to the lightness of the analog image signal, that is, the level of the luminance. In this manner, low-luminance regions are amplified by a greater gain than high-luminance regions.

In detail, the first signal processing means 107 includes a first analog-to-digital (ADC) 107a, a gain selector 107b and an amplifier 107c. The first ADC 107a converts the analog image signal into a digital image signal, dividing the image signal into the plurality of sections. The gain selector 107b selects the corresponding gain according to each section. The amplifier 107c amplifies the analog image signal with the gain output from the gain selector 107b.

The second signal processing means 109 converts the analog signal amplified with different gains, that is, the output of the amplifier 107c, into a digital signal, and non-linearly gamma-corrects the digital signal according to each section (see FIG. 3, discussed below).

In detail, the second signal processing means 109 includes a second ADC 109a and a gamma corrector 109b. The second ADC 109a converts the output of the amplifier 107c into a digital signal. The gamma corrector 109b non-linearly gamma-corrects the digital signal according to each section in consideration of the section-dependent gain of the analog image signal.

The optimal chrominance controller 111 controls the chrominance gain of the output of the gamma corrector 109b, in order to display improved color in low-illumination regions. In particular, the chrominance controller 111 may be positioned between an ADC and a digital camera processor of a general camera system adopting a CCD, in order to display improved color in low-illumination regions.

The digital camera processor 113 digitally processes the output of the chrominance controller 111. The DAC 117 converts the output of the digital cameral processor 113 into an analog image signal, and outputs the converted result into a display. The microcomputer 115 calculates the plurality of gain levels from the output of the digital camera processor 113 such that the mean of the luminance distribution in an image is maintained at a predetermined value, and provides the calculated gains to the gain selector 107b, as described above.

Figure 2:
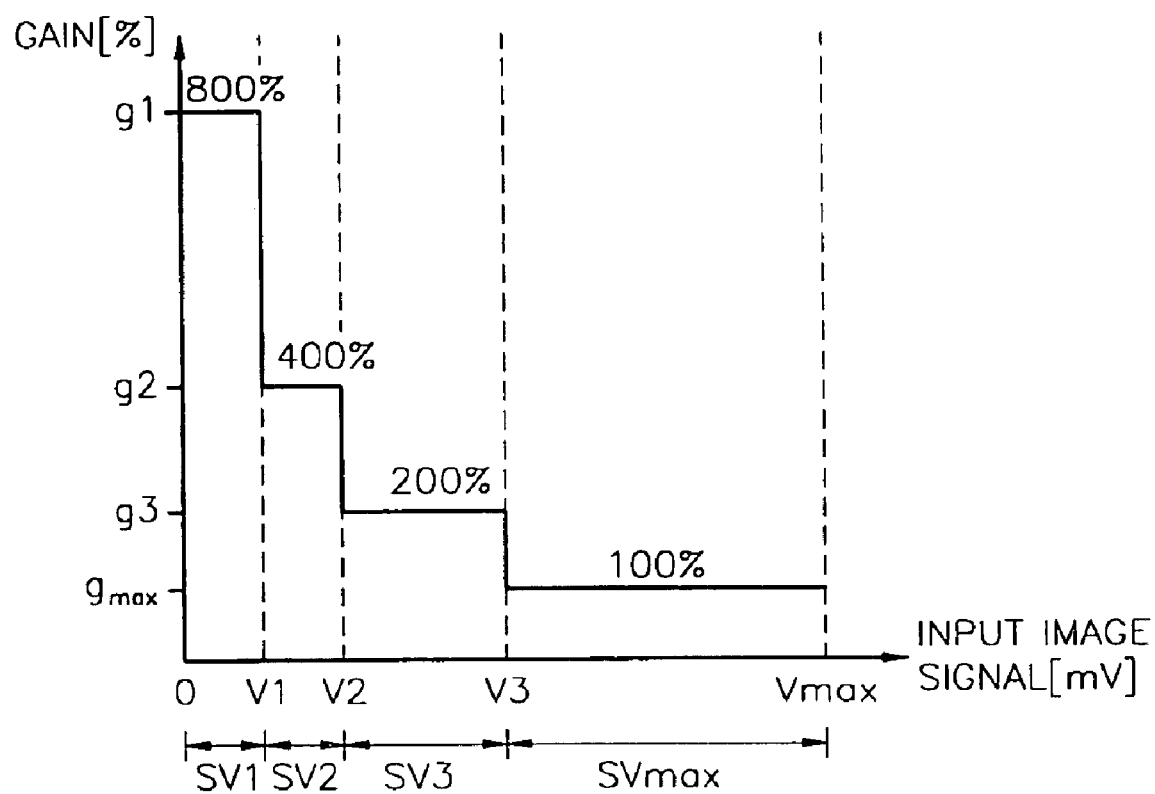
FIG. 2 is a graph illustrating the gain characteristics of the gain selector of FIG. 1, in accordance with the present invention.

FIG. 2 is a graph showing the characteristics of the gain selector 107b shown in FIG. 1. Here, the horizontal axis represents an input image signal, that is, the voltage level (in mV) of the analog image signal, and the vertical axis represents a corresponding gain for each voltage level.

Referring to FIG. 2, the voltage level of the analog image signal is divided into four sections. If required, the level of the analog image signal may be divided into more than, or less than, four sections. It is optimal that the voltage level of the analog image signal is divided as many sections as possible. However, preferably the level of the analog image signal is classified into the several sections according to the signal processing characteristics of the application. Here, section SV1 pertains to voltages between level 0 and level V1 of the analog image signal, section SV2 covers level V1 to level V2, section SV3 refers to level V2 to level V3, and section $SV_{max}$ covers level V3 to level $V_{max}$.

As described above, in order to amplify the level of the analog image signal in low-luminance regions according to a gain greater than that for high-illumination regions, four gains g1, g2, g3 and $g_{max}$, which are inversely proportional to the illuminance level of the analog image signal, are provided. Here, the gains g1, g2, g3 and $g_{max}$ are provided to be the maximum within the range in which the output of the amplifier does not exceed the maximum permissible output of the amplifier. In the case shown in FIG. 2, the gain g1 for section SV1 is 800%, the gain g2 for section SV2 is 400%, the gain g3 for section SV3 is 200%, and the gain $g_{max}$ for section $SV_{max}$ is 100%. In the example given, preferably, the level V1 of the analog image signal is 1/8 of the level $V_{max}$ of the analog image signal, the level V2 of the analog image signal is 1/4, and the level V3 of the analog image signal is 1/2 of the level $V_{max}$ of the analog image signal.

Figure 3:
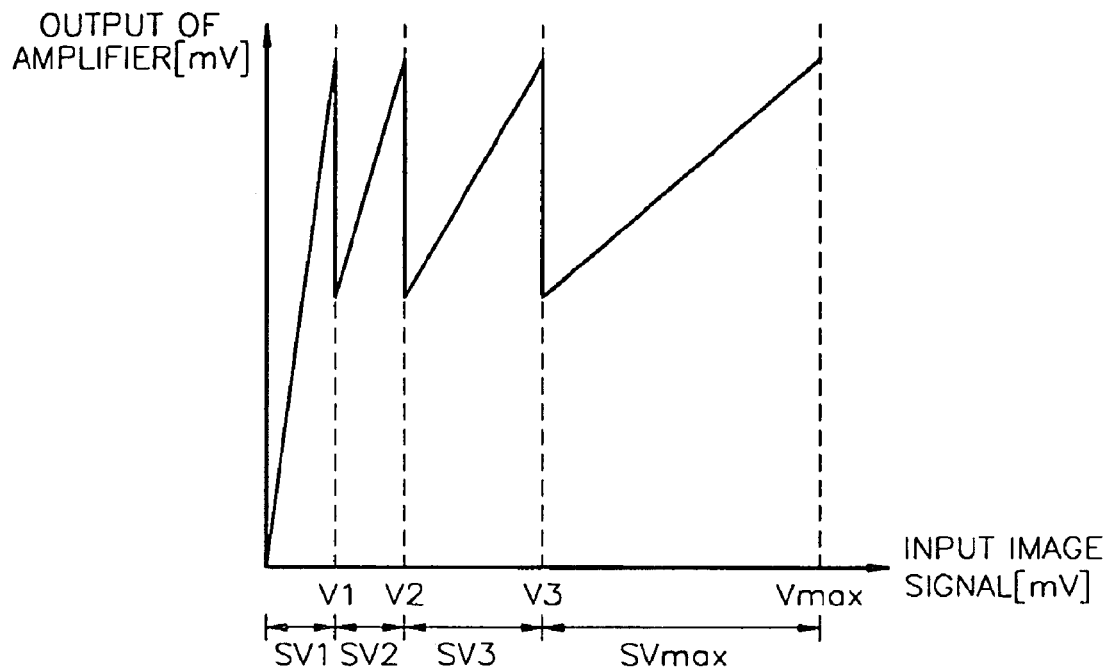
FIG. 3 is a graph illustrating the input-output correlation of the amplifier shown in FIG. 1 in accordance with the present invention.

FIG. 3 is a graph showing an input-output correlation of the amplifier 107c shown in FIG. 1. The outputs of the amplifier 107c are obtained using the four gains g1, g2, g3 and $g_{max}$ shown in FIG. 2. Here, the horizontal axis represents an input image signal, that is, the level of the analog image signal, and the vertical axis represents the output of the amplifier.

Referring to FIG. 3, in the section SV1 corresponding to a low-luminance region of the analog image signal, variance in the output of the amplifier 107c is the greatest. As the luminance increases, that is, from the section SV2 to the section $SV_{max}$, change in output of the amplifier 107c gradually decreases.

Figure 4:
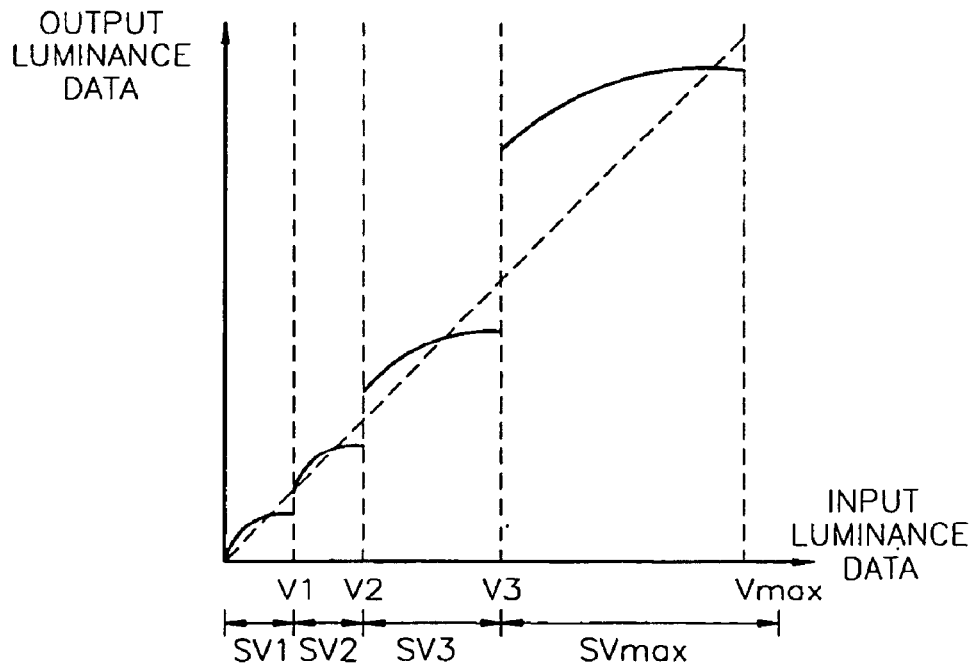
FIG. 4 is a graph illustrating the characteristics of the gamma corrector shown in FIG. 1 in accordance with the present invention.

FIG. 4 is a graph illustrating the characteristics of the gamma corrector 109b shown in FIG. 1.

Referring to FIG. 4, the gamma corrector 109b shows a non-linear output characteristic according to sections SV1, SV2, SV3 and $SV_{max}$. That is, the gamma corrector 109b non-linearly gamma-corrects the output of the second ADC 109a according to each section, in consideration of the section-dependent gain, and outputs the gamma-corrected result.

Figure 5:
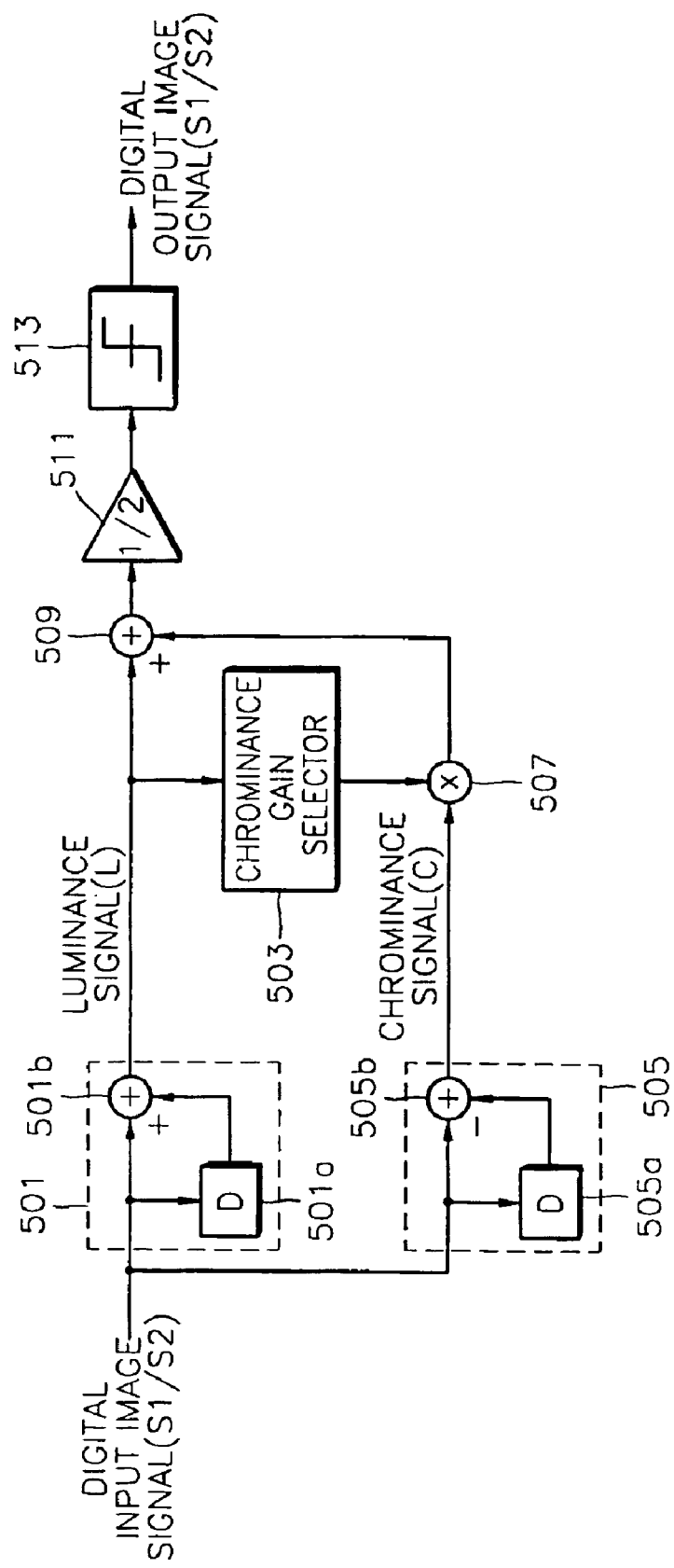
FIG. 5 is a circuit diagram of the chrominance controller shown in FIG. 1 in accordance with the present invention.

FIG. 5 is a circuit diagram of a preferred embodiment of the chrominance controller 111 shown in FIG. 1.

Referring to FIG. 5, the chrominance controller includes a low pass filter 501, a chrominance gain selector 503, a high pass filter 505, a multiplier 507, an adder 509, a divider 511 and a clipper 513.

The low pass filter 501 passes only the low-frequency component of the output of the gamma corrector 109b (see FIG. 1), that is, low-frequency component of a digital input image signal S1/S2, and outputs a luminance signal L. The low pass filter 501 includes a delay 501a for delaying the digital input image signal S1/S2 by, for example 1 clock cycle, and an adder 501b for adding the output of the delay 501a to the digital input image signal S1/S2, to output the luminance signal L.

The chrominance gain selector 503 divides the level of the luminance signal L into a plurality of sections, selects the corresponding gain among the different gains according to each section, and outputs the gain. In general, the plurality of gains are preferably approximately inversely proportional to the level of the luminance signal. In alternative embodiments, however, the relationship need not be inversely proportional.

The high pass filter 505 passes only a high-frequency component of the digital input image signal S1/S2, and outputs a chrominance signal C. The high pass filter 505 includes a delay 505a for delaying the digital input image signal S1/S2 by, for example 1 clock cycle, and a subtractor 505b for subtracting the output of the delay 505a from the digital input image signal S1/S2 and outputting the chrominance signal C.

The multiplier 507 multiplies the chrominance signal C by the gain output from the chrominance gain selector 503. Adder 509 adds the output of the multiplier 507 to the luminance signal L. The divider 511 divides the output of the adder 509, for example by 2. The clipper 513 outputs 0 when the output of the divider 511 is less than 0, the maximum value of the digital input image signal S1/S2 when the output of the divider 511 is greater than the digital input image signal S1/S2. Also, the clipper 513 outputs the output of the divider 511 when the output of the divider 511 is greater than 0 and less than the maximum value of the digital input image signal S1/S2.

Figure 6:
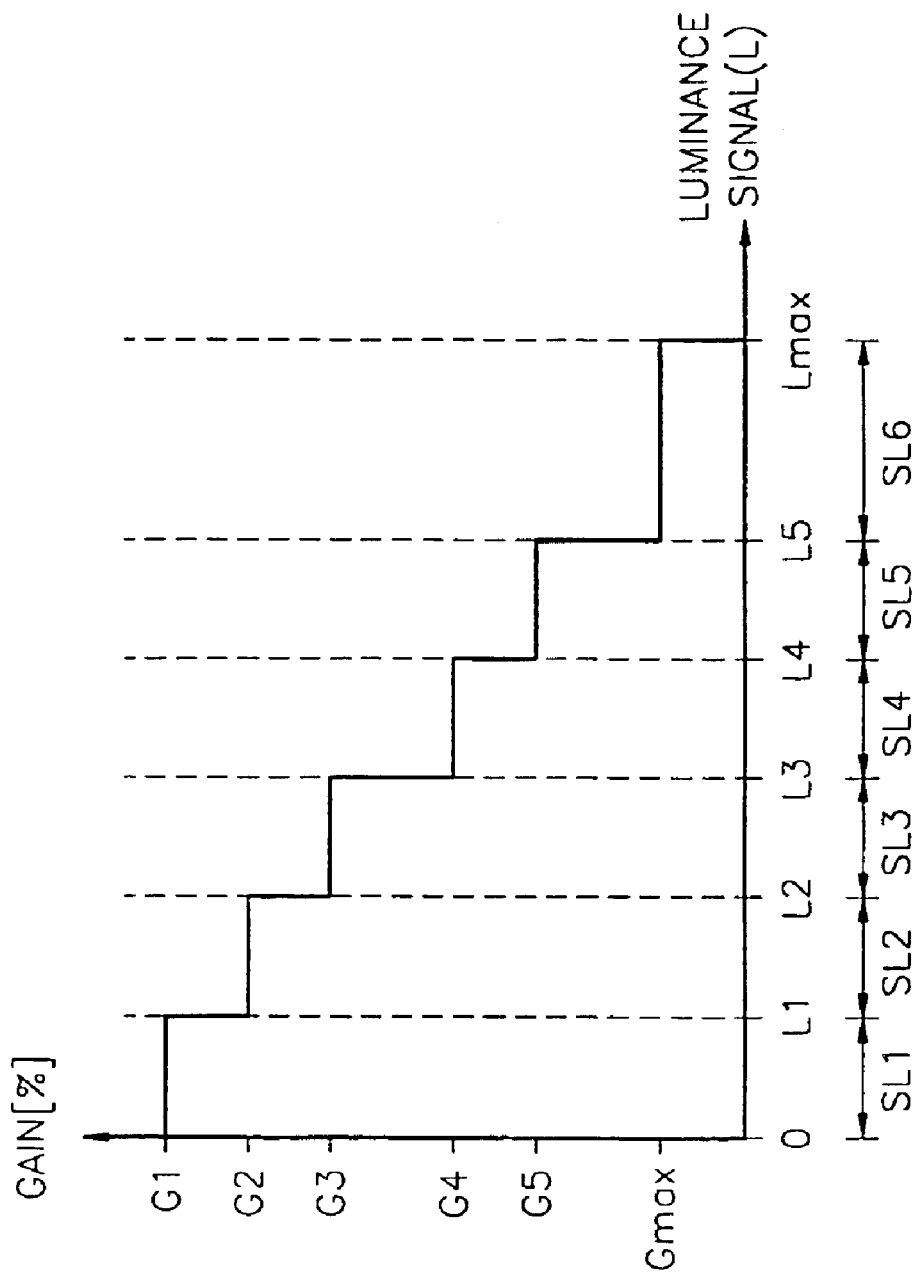
FIG. 6 is a graph illustrating the characteristics of the chrominance gain selector shown in FIG. 5 in accordance with the present invention.

FIG. 6 is a graph showing the characteristics of the chrominance gain selector 503 shown in FIG. 5. Here, the horizontal axis represents the level of the luminance signal L, and the vertical axis represents again to be applied to multiplier 507.

Referring to FIG. 6, the level of the luminance signal L is divided into six sections SL1, SL2, SL3, SL4, SL5 and $SL_{max}$, and different gains G1, G2, G3, G4, G5 and $G_{max}$ are provided according to each section. In particular, in order to display an improved color in a low-luminance region, the gains G1, G2, G3, G4, G5 and $G_{max}$, which are inversely proportional to the level of the luminance signal L as shown in FIG. 6, are provided. However, as explained above, the gains G1, G2, G3, G4, G5 and $G_{max}$ need not be inversely proportional to luminance signal level.

Here, section SL1 pertains to a voltage level between level 0 and level L1 of the luminance signal L, section SL2 covers level L1 to level L2, section SL3 covers level L2 to level L3, section SL4 covers level L3 to level L4, section SL5 covers level L4 to level L5, and section $SL_{max}$ covers level L5 to level $L_{max}$ of the luminance signal L.

As described above, in the imaging apparatus and the image signal processing method according to the present invention, the level of an analog signal low-luminance regions of the analog input signal are amplified by a gain greater than the gains applied to the high-luminance regions before gamma correction, allowing for increased signal-to-noise (S/N) ratio in the low-luminance regions of the image, and improving image sensitivity following gamma correction. Also, the digitally-quantized value for the analog image signal is non-linearly gamma-corrected according to the luminance level, so that quantization noise decreases, thereby mitigating or preventing lumping of the output image. In this manner, the imaging apparatus and the image signal processing method according to the present invention provide a wide dynamic range, and improved color display in low-luminance regions of the image is achieved.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An imaging apparatus comprising:
   first signal processing means including a first analog-to-digital converter for converting an analog image signal into a first digital signal for partitioning the level of the analog image signal into a plurality of sections, a gain selector for selecting a corresponding gain from a plurality of different gains according to each of the plurality of sections, and an amplifier for amplifying the analog image signal by the plurality of gains according to each of the plurality of sections, at least two of the sections having different corresponding gains; and
   second signal processing means including a second analog-to-digital converter for converting the analog image signal amplified by the plurality of different gains into a second digital signal, and a gamma corrector for non-linearly gamma-correcting the second digital signal according to each section of the plurality of sections on which the amplification of the analog image signal by the first signal processing means is based.

2. The imaging apparatus of claim 1, wherein the plurality of different gains are provided by a microcomputer.

3. The imaging apparatus of claim 1, wherein the plurality of different gains are approximately inversely proportional to the luminance level of the analog image signal.

4. The imaging apparatus of claim 1, further comprising a chrominance controller for controlling chrominance gain of the non-linearly gamma corrected digital output of the second signal processing means.

5. The imaging apparatus of claim 4, wherein the chrominance controller comprises:
   a low pass filter for passing a low-frequency component of the non-linearly gamma corrected digital output of the second means, to output a luminance signal;
   a chrominance gain selector for partitioning the level of the luminance signal into a plurality of second sections, and for selectively outputting a corresponding second gain among a plurality of different second gains according to each section;
   a high pass filter for passing a high frequency component of the non-linearly gamma corrected digital output of the second means, to output a chrominance signal;
   a multiplier for multiplying the chrominance signal by the corresponding second gain from the chrominance gain selector;
   an adder for adding the output of the multiplier to the luminance signal;
   a divider for dividing the output of the adder by approximately 2; and
   a clipper for outputting a digital 0 if the output of the divider is less than 0, and for outputting the maximum value of the output of the second signal processing means if the output of the divider is greater than the maximum value of the output of the second signal processing means.

6. The imaging apparatus of claim 5, wherein the plurality of different second gains are approximately inversely proportional to the level of the luminance signal.

7. An imaging apparatus comprising:
   an amplifier for amplifying an analog image signal by a predetermined gain;
   an analog-to-digital converter for converting the amplified analog image signal into a digital signal;
   a chrominance controller for controlling chrominance gain of the converted output of the analog-to-digital converter; and
   a digital signal processor for processing the output of the chrominance controller.

8. The imaging apparatus of claim 7, wherein the chrominance controller comprises:
   a low pass filter for passing a low-frequency component of the converted output of the analog-to-digital converter, to output a luminance signal;
   a chrominance gain selector for dividing the level of the luminance signal into a plurality of sections, and for selectively outputting a corresponding gain among the plurality of different gains according to each section;
   a high pass filter for passing a high frequency component of the converted output of the analog-to-digital converter, to output a chrominance signal;
   a multiplier for multiplying the chrominance signal by the corresponding gain output from the chrominance gain selector;
   an adder for adding the output of the multiplier to the luminance signal;
   a divider for dividing the output of the adder by a factor; and
   a clipper for outputting a digital 0 if the output of the divider is less than 0, and for outputting the maximum value of the output of the analog-to-digital converter if the output of the divider is greater than the maximum value of the output of the analog-to-digital converter.

9. The imaging apparatus of claim 8, wherein the plurality of different gains are approximately inversely proportional to the level of the luminance signal.

10. The imaging apparatus of claim 8, wherein the factor is approximately 2.

11. An image signal processing method comprising:
    converting an analog image signal into a first digital signal for partitioning the level of the analog image signal into a plurality of sections, selecting a corresponding gain among a plurality of different gains according to each of the plurality of sections and amplifying the image signal by the plurality of different gains according to each of the plurality of sections, at least two of the sections having different corresponding gains; and converting the image signal amplified by the plurality of different gains into a second digital signal, and non-linearly gamma-correcting the second digital signal according to each section of the plurality of sections on which the amplification of the analog image signal is based.

12. The method of claim 11, wherein the plurality of different gains are provided by a microcomputer.

13. The method of claim 11, wherein the plurality of different gains are approximately inversely proportional to the luminance level of the analog image signal.

14. The method of claim 11, further comprising controlling chrominance gain of the non-linearly gamma-corrected second digital signal.

15. The method of claim 14, wherein controlling comprises:

passing a low-frequency component of the non-linearly gamma-corrected digital signal, to output a luminance signal;

partitioning the level of the luminance signal into a plurality of second sections, and selecting a corresponding second gain among a plurality of different second gains according to each second section;

passing a high-frequency component of the nonlinearly gamma-corrected digital signal, to output a chrominance signal;

multiplying the chrominance signal by the corresponding selected second gain;

adding the result of the multiply to the luminance signal;

dividing the result of the add by approximately 2; and clipping to 0 if the result of the division is less than 0, and clipping to the maximum value of the gamma-corrected digital signal if the result of the division is greater than the maximum value of the gamma-corrected digital signal, and outputting the result.

16. The method of claim 15, wherein the plurality of second gains are approximately proportional to the luminance level of the analog image signal.

* * * * *